(12) United States Patent
Jang et al.

(10) Patent No.: US 8,812,317 B2
(45) Date of Patent: Aug. 19, 2014

(54) SIGNAL PROCESSING APPARATUS CAPABLE OF LEARNING A VOICE COMMAND WHICH IS UNSUCCESSFULLY RECOGNIZED AND METHOD OF RECOGNIZING A VOICE COMMAND THEREOF

(75) Inventors: Jong-hyuk Jang, Gunpo-si (KR); Seung-kwon Park, Yongin-si (KR); Jong-ho Lea, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 912 days.

(21) Appl. No.: 12/552,540

(22) Filed: Sep. 2, 2009

(65) Prior Publication Data

US 2010/0179812 A1 Jul. 15, 2010

(30) Foreign Application Priority Data

Jan. 14, 2009 (KR) ........................ 10-2009-0003026

(51) Int. Cl.
*G10L 15/06* (2013.01)
*G10L 15/22* (2006.01)

(52) U.S. Cl.
USPC ............................ 704/244; 704/270; 704/275

(58) Field of Classification Search
USPC .......................................... 704/275, 270, 244
See application file for complete search history.

(56) References Cited

U.S. PATENT DOCUMENTS

| | | | |
|---|---|---|---|
| 5,852,801 A * | 12/1998 | Hon et al. ...................... | 704/244 |
| 5,970,451 A * | 10/1999 | Lewis et al. ................... | 704/251 |
| 6,327,566 B1 * | 12/2001 | Vanbuskirk et al. .......... | 704/257 |
| 6,374,221 B1 | 4/2002 | Haimi-Cohen | |
| 6,587,824 B1 * | 7/2003 | Everhart et al. ............... | 704/275 |
| 6,754,627 B2 * | 6/2004 | Woodward ..................... | 704/235 |
| 6,799,162 B1 * | 9/2004 | Goronzy et al. .............. | 704/244 |
| 6,873,951 B1 * | 3/2005 | Lin et al. ........................ | 704/251 |
| 6,912,498 B2 * | 6/2005 | Stevens et al. ................ | 704/235 |
| 7,516,077 B2 * | 4/2009 | Yokoi et al. .................... | 704/275 |
| 2002/0198722 A1 * | 12/2002 | Yuschik ......................... | 704/275 |
| 2004/0030560 A1 * | 2/2004 | Takami et al. ................ | 704/275 |
| 2005/0049862 A1 * | 3/2005 | Choi et al. .................... | 704/231 |
| 2007/0100632 A1 * | 5/2007 | Aubauer ....................... | 704/275 |

FOREIGN PATENT DOCUMENTS

KR 10-0301596 B1 6/2001
KR 10-0346736 B1 7/2002

OTHER PUBLICATIONS

Young, "A Review of Large-vocabulary Continuous-speech Recognition", IEEE Signal Processing Magazine, Sep. 1996.*
European Search Report dated Nov. 10, 2009 Issued in Counterpart Application No. 09169327.5.

* cited by examiner

*Primary Examiner* — Jialong He
(74) *Attorney, Agent, or Firm* — Sughrue Mion, PLLC

(57) ABSTRACT

Provided are an apparatus and method for recognizing voice commands, the apparatus including: a voice command recognition unit which recognizes an input voice command; a voice command recognition learning unit which learns a recognition-targeted voice command; and a controller which controls the voice command recognition unit to recognize the recognition-targeted voice command from an input voice command, controls the voice command recognition learning unit to learn the input voice command if the voice command recognition is unsuccessful, and performs a particular operation corresponding to the recognized voice command if the voice command recognition is successful.

16 Claims, 9 Drawing Sheets

FIG. 7A

| ATTEMPT NUMBER | FEATURE VALUE | SUCCESS/FAILURE |
|:---:|:---:|:---:|
| 1 | <Voice Command Feature Data> | FAILURE |
| 2 | <Voice Command Feature Data> | FAILURE |
| . . . | . . . | FAILURE |
| n | <Voice Command Feature Data> | SUCCESS |

| FINAL RECOGNITION WORD | VOICE COMMAND FEATURE DATA IN FINAL RECOGNITION | VOICE COMMAND FEATURE DATA TO BE LEARNED | |
|---|---|---|---|
| 'VOLUME' | <Voice Command Feature Data> | <Voice Command Feature Data> | ~ 720 |
| 'TV' | <Voice Command Feature Data> | <Voice Command Feature Data> | |
| . . . | . . . | . . . | |

FIG. 7C

| FINAL RECOGNITION WORD | Voice Command Feature Data |
|---|---|
| 'VOLUME' | <Voice Command Feature Data> — 730 |
| 'TV' | <Voice Command Feature Data> |
| . . . | . . . |

SIGNAL PROCESSING APPARATUS CAPABLE OF LEARNING A VOICE COMMAND WHICH IS UNSUCCESSFULLY RECOGNIZED AND METHOD OF RECOGNIZING A VOICE COMMAND THEREOF

CROSS-REFERENCE TO RELATED APPLICATIONS

This application claims priority from Korean Patent Application No. 10-2009-0003026, filed on Jan. 14, 2009 in the Korean Intellectual Property Office, the disclosure of which is incorporated herein by reference.

BACKGROUND OF INVENTION

1. Field of Invention

Methods and devices consistent with the present invention relate to signal processing and voice command recognition, and more particularly, to learning voice command instructions, which have erred previously, through learning about repeated mistakes.

2. Description of the Related Art

In voice command recognition technologies, it is important to recognize input voice command instructions. Accordingly, existing voice command recognition techniques have learned voice command to adapt themselves to various input environments in order to achieve a high recognition rate even when input voice command signals are distorted.

FIG. 1 is a flow chart showing a related art voice command recognition and learning process.

Referring to FIG. 1, first, a signal processing apparatus activates a voice command recognition function (S101).

When voice command is input from a user (S102), the signal processing apparatus recognizes the input voice command (S103).

Then, the signal processing apparatus outputs the recognized voice command (S104) and performs an operation based on a result of the recognition (S105). The signal processing apparatus determines whether the user stops the operation which has been performed (S106). If the operation does not correspond to a control instruction intended by the user, the user may stop the operation being performed by the signal processing apparatus. That is, if a result of the voice command recognition is different from the one that the user has intended (or if the voice command recognition fails), the user may cancel it and input voice command again. Accordingly, if the operation is stopped by the user, the signal processing apparatus is again input with a voice command instruction from the user. On the other hand, in case where the operation is not stopped by the user, the signal processing apparatus calculates reliability of recognition result (S107).

The signal processing apparatus determines whether or not the calculated reliability exceeds a predetermined level. If it is determined that the calculated reliability exceeds a predetermined level (S108), the signal processing apparatus learns the recognized voice command (S109). However, if it is determined that the calculated reliability is below a predetermined level, the signal processing apparatus is again input with a voice command instruction from the user.

In the related art, if voice command recognition was successful and a result of the voice command recognition was determined to have a reliable level, the successful voice command was re-learned using corresponding data. For example, after temporarily storing a voice command recognition result and a feature vector calculated in the voice command recognition, if it was determined that the voice command recognition was reliable according to an aspect of apparatus operation by a user, the successful voice command was used for re-learning.

Accordingly, if voice command recognition failed or if it was determined that the voice command recognition result did not reach a reliable level since reliability of the voice command recognition was below a predetermined level although the voice command recognition had been successful, re-input voice command was not learned.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides a signal processing apparatus which is capable of successfully learning voice commands, which have erred previously, through learning about repeated errors, and a method of recognizing voice command thereof.

Additional aspects of the present invention will be set forth in part in the description which follows and, in part, will be obvious from the description, or may be learned by practice of the present invention.

According to an aspect of the present invention, there is provided a signal processing apparatus including: a voice command recognition unit which recognizes an input voice command; a voice command recognition learning unit which learns a recognition-targeted voice command; and a controller which controls the voice command recognition unit to recognize the recognition-targeted voice command from the input voice command, controls the voice command recognition learning unit to learn the input voice command if the voice command recognition is unsuccessful, and performs a particular operation corresponding to the recognized voice command if the voice command recognition is successful.

In the signal processing apparatus, the controller may control the voice command recognition learning unit to learn the input voice command if the voice command recognition is successful. The voice command recognition learning unit may determine a similarity between the input voice command and the recognition-targeted voice command by comparing feature values of the input voice command with feature values of the recognition-targeted voice command. The controller may control the voice command recognition learning unit to learn features of the input voice command if the similarity between the input voice command and the recognition-targeted voice command is above a predetermined level. The voice command recognition learning unit may learn the features of the input voice command using an Acoustic model. The controller may control the voice command recognition learning unit to add the input voice command to the recognition-targeted voice command if a similarity between the input voice command and the recognition-targeted voice command is below a predetermined level. The voice command recognition learning unit may add the input voice command to the recognition-targeted voice command using a Lexicon model. The signal processing apparatus may further include a user input unit which receives information on whether the voice command recognition is unsuccessful or successful from a user.

According to another aspect of the present invention, there is provided a method of recognizing voice command in a signal processing apparatus, the method including: inputting a voice command; recognizing a recognition-targeted voice command from the input voice command; and learning the input voice command if the voice command recognition is unsuccessful and performing a particular operation corresponding to the recognized voice command if the voice command recognition is successful.

The input voice command may be learned if the voice command recognition is successful. A similarity may be determined by comparing feature values of the input voice command with feature values of the recognition-targeted voice command. Features of the input voice command are learned if the similarity between the input voice command and the recognition-targeted voice command is above a predetermined level. The features of the input voice command may be learned using an Acoustic model. The input voice command may be added to the recognition-targeted voice command if the similarity between the input voice command and the recognition-targeted voice command is below a predetermined level. The input voice command is added to the recognition-targeted voice command using a Lexicon model. The method may further include receiving information on whether the voice command recognition is unsuccessful or successful from a user.

According to an aspect of the invention, it is possible to successfully learn voice command instructions, which have erred previously, through learning about repeated mistakes. In addition, by storing instructions, which were unsuccessfully recognized unintentionally, and learning a relationship between a final successful voice command instruction and previous voice command instructions, voice command instructions, which were unsuccessfully recognized before learning, can be also successfully utilized after learning.

BRIEF DESCRIPTION OF THE DRAWINGS

The above and/or other features of the present invention will become apparent and more readily appreciated from the following description of the exemplary embodiments, taken in conjunction with the accompanying drawings, in which:

FIG. 7A is a view showing an example of a stored voice command recognition result.

FIG. 7B is a view showing an example of stored Acoustic model learning data.

FIG. 7C is a view showing an example of stored Lexicon model learning data.

DETAILED DESCRIPTION OF EXEMPLARY EMBODIMENTS OF THE INVENTION

Figure 1:
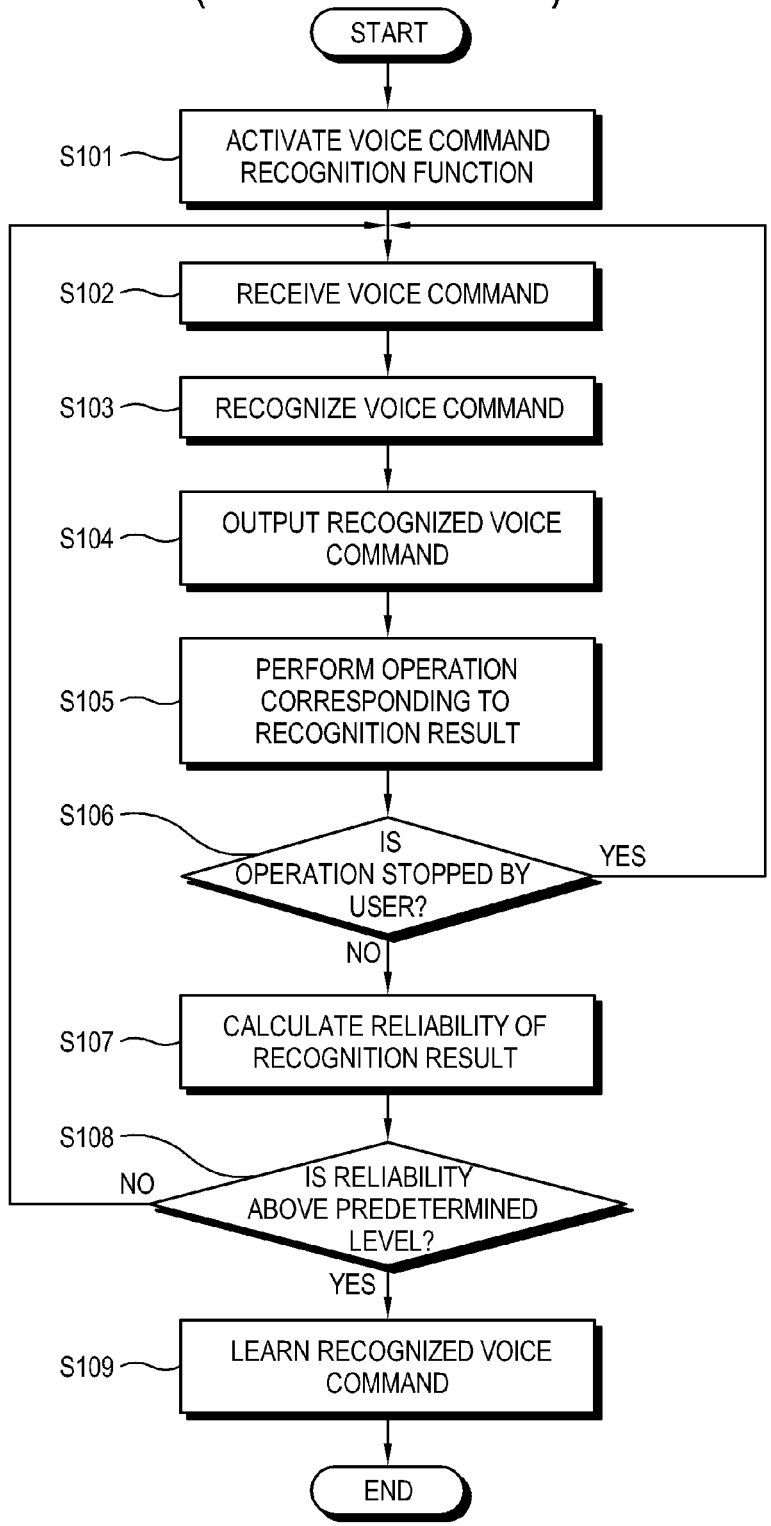
FIG. 1 is a flow chart showing a related art voice command recognition and learning process.

Reference will now be made in detail to the exemplary embodiments of the present invention, examples of which are illustrated in the accompanying drawings, so that those in the art can easily practice the present invention. The present invention is not limited to exemplary embodiment disclosed herein but may be implemented in different forms. In the following exemplary embodiments, for the purpose of clarity, the same components are denoted by the same reference numerals throughout the drawings, and explanation thereof will be representatively given in a first exemplary embodiment but will be omitted in the other exemplary embodiments.

Figure 2:
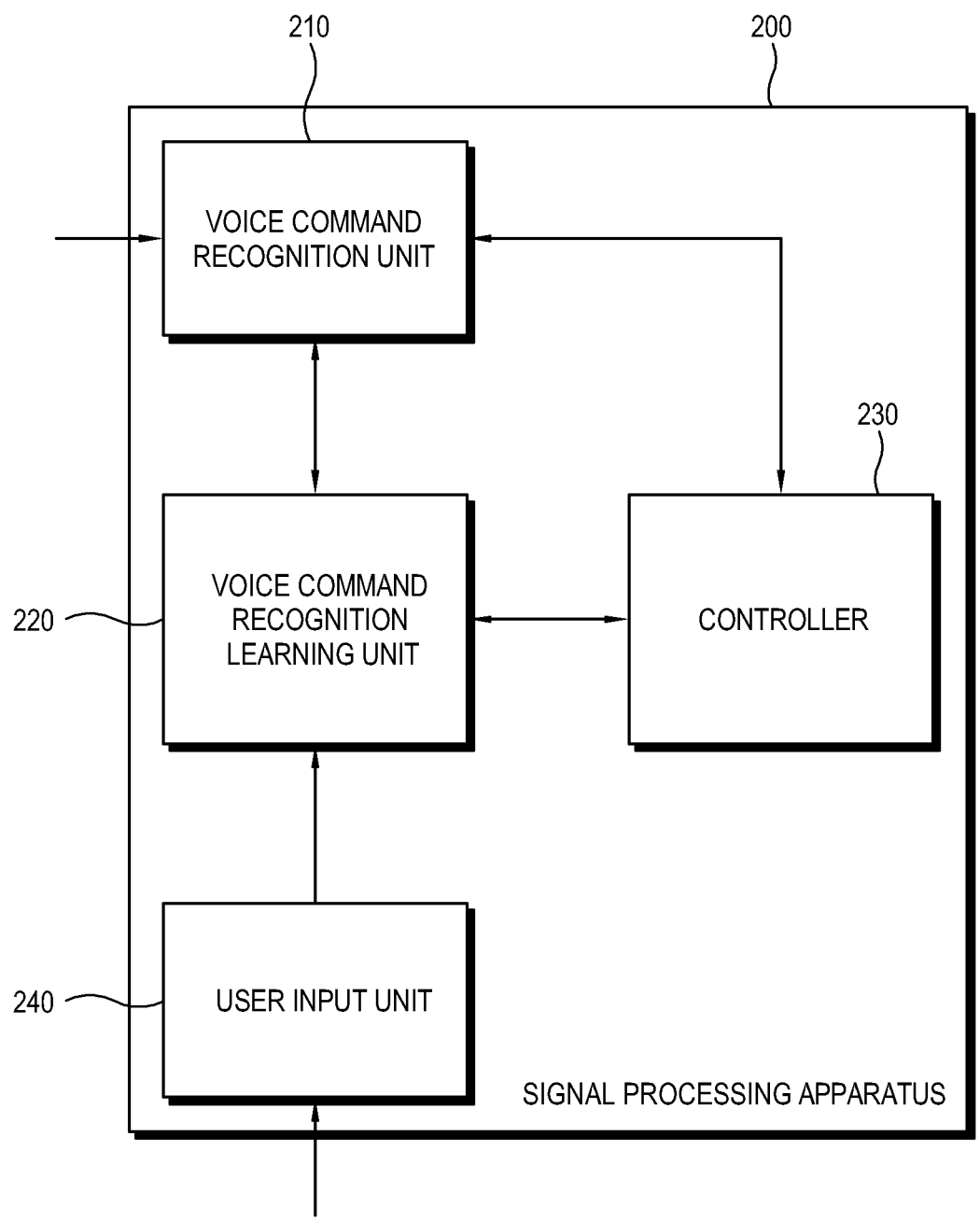
FIG. 2 is a view showing a configuration of a signal processing apparatus according to an exemplary embodiment of the present invention.

FIG. 2 is a view showing a configuration of a signal processing apparatus according to an exemplary embodiment of the present invention.

A signal processing apparatus 200 according to an exemplary embodiment of the present invention may be any of a digital TV, a desk-top computer, a notebook computer, a set-top box, a digital versatile disc (DVD)/blue-ray disc (BD) player, a DVD recorder, and others electronic devices known in the art as long as they can recognize voice command instructions and perform corresponding operation.

In an exemplary embodiment, the signal processing apparatus 200 may include a voice command recognition unit 210, a voice command recognition learning unit 220, a controller 230 and a user input unit 240.

The voice command recognition unit 210 recognizes an input voice command. In this case, the voice command recognition unit 210 may quantize the input voice command, extract a feature value from the quantized voice command, and match and compare the extracted feature value with a feature value of a voice command recognition-targeted word.

The voice command recognition learning unit 220 learns the voice command to be recognized. In this case, the voice command recognition learning unit 220 may learn an input voice command which failed in voice command recognition under control of the controller 230.

If the voice command recognition failed without a user's intention, the user may speak in a manner different from the voice command instruction that has erred previously (for example, speak the voice command instruction more loudly or more clearly) or speak a different voice command instruction (for example, voice command instruction having fewer syllables or words). Accordingly, the voice command recognition learning unit 220 learns from unsuccessful attempts and learns from repetitive mistakes as follows:

First, voice command recognition errors may occur due to factors such as tone, loudness, intonation, dialect and the like of user's voice command. In order to overcome the voice command recognition errors caused by such factors, the voice command recognition learning unit 220 may perform automated user-adaptable voice command recognition by calculating a similarity between a correct/incorrect pattern and the input voice command instructions in attempting to recognize the user's voice command and utilizing a difference between voice command instructions, which have been previously classified as incorrect before learning, and correct voice command instructions when re-learning a phonemic model of voice command recognition.

Second, when a user speaks a voice command instruction for apparatus operation, the user may speak an instruction which differs from an instruction to be recognized due to habit, or due to a form of instruction, a selected word or the number of selected syllables. For example, if an instruction to turn up the TV volume is designated to be "Volume high," the user may unintentionally issue an instruction with "Volume up," "Sound high," etc. In this case, a voice command recognition error occurs and the user will issue the designated instruction through repeated trial and error. In this case, the voice command recognition learning unit 220 stores the instructions issued by the user, calculates the similarity between the stored instructions and the designated instruction, and matches the words, "Volume up" and "Sound high," unintentionally pronounced by the user, with the designated instruction, "Volume high."

In this case, the voice command recognition learning unit 220 may learn the voice command according to an Acoustic model or a Lexicon model. Specifically, if the similarity between an input voice command and a voice command to be recognized reaches a predetermined level or above, the voice command recognition learning unit 220 may determine features of the input voice command using the Acoustic model. On the other hand, if the similarity between the input voice command and the voice command to be recognized is below the predetermined level, the voice command recognition learning unit 220 may add the input voice command to the voice command to be recognized using the Lexicon model.

To this end, the voice command recognition learning unit 220 may determine the similarity between the input voice command and the voice command to be recognized by comparing feature values of the input voice command with feature values of the voice command to be recognized. In addition, the voice command recognition learning unit 220 may determine the similarity between the input voice command and the voice command to be recognized by finding similar values of the input voice command and the voice command to be recognized.

The voice command recognition learning unit 220 may include a memory or a disc for storing a result of voice command recognition and voice command recognition learning data. In this case, the voice command recognition learning unit 220 may store the result of voice command recognition and the voice command recognition learning data in the memory or the disc according to a particular format, which will be described in detail later with reference to FIGS. 7A to 7C.

The controller 230 may control the voice command recognition unit 210 to recognize recognition-targeted voice command from input voice command. In addition, if the voice command recognition is successful, the controller 230 may perform a particular operation corresponding to the recognized voice command.

On the other hand, the controller 230 may control the voice command recognition learning unit 220 to learn the input voice command if the voice command recognition is unsuccessful. In this case, if the similarity between the input voice command and the recognition-targeted voice command is above a predetermined level, the controller 230 may control the voice command recognition learning unit 220 to learn the features of the input voice command. On the other hand, if the similarity between the input voice command and the recognition-targeted voice command is below the predetermined level, the controller 230 may control the voice command recognition learning unit 220 to add the input voice command as recognition-targeted voice command.

Further, if the voice command recognition is successful as well as if the voice command recognition is unsuccessful, the controller 230 may control the voice command recognition learning unit 220 to learn the input voice command.

The user input unit 240 receives, from the user, information on whether the voice command recognition is unsuccessful or successful. That is, the user input unit 240 receives a feedback from the user. In this case, a method of receiving the user's feedback may be implemented in various ways. For example, if an instruction corresponding to cancellation of a voice command input is issued within a predetermined period of time, an input key indicating that a result of voice command recognition is incorrect is pushed, or there is no input from the user in a predetermined period of time, the signal processing apparatus 200 may determine that the voice command recognition is unsuccessful.

Figure 3:
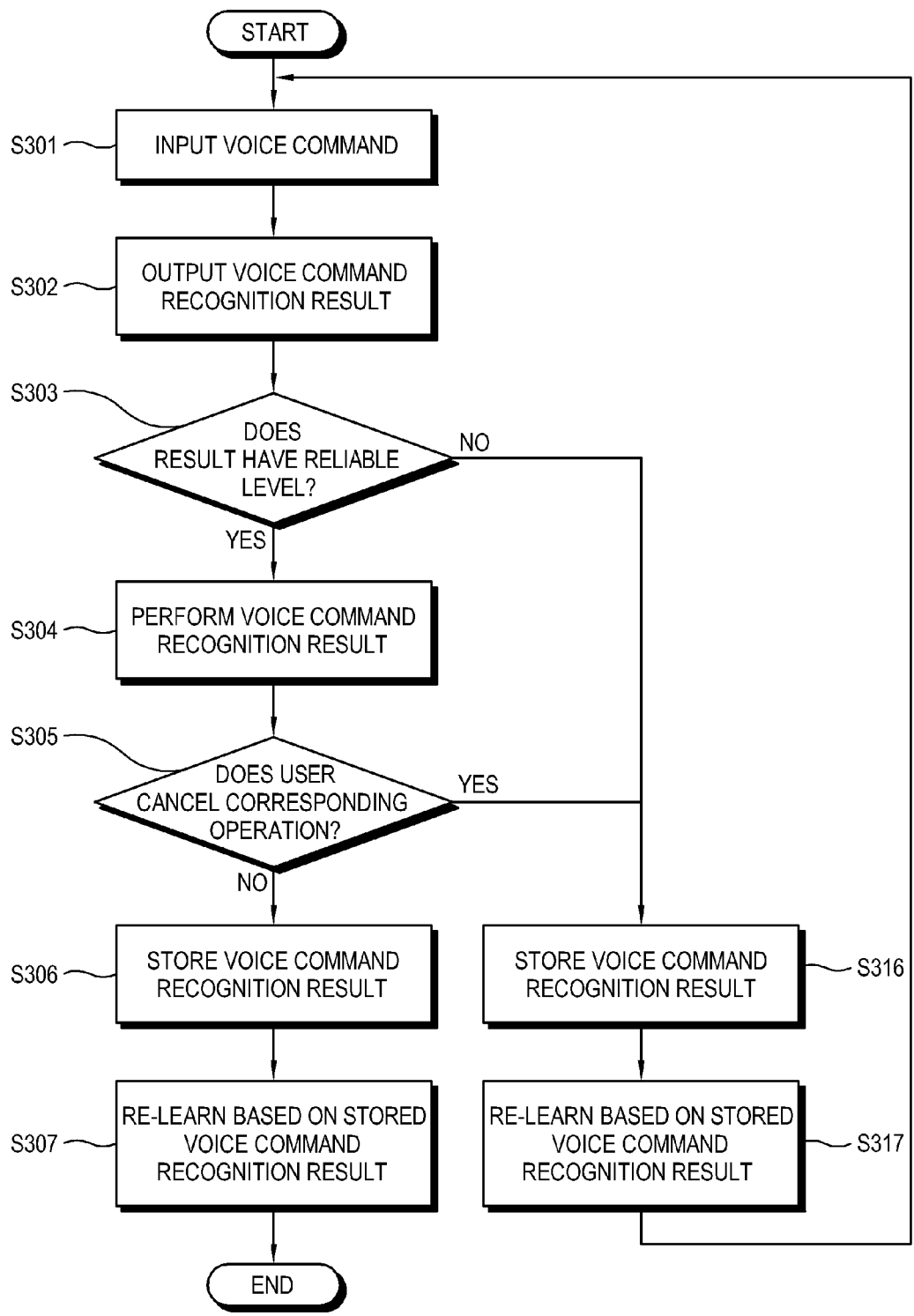
FIG. 3 is a flow chart showing a voice command recognition process in a signal processing apparatus according to an exemplary embodiment of the present invention.

FIG. 3 is a flow chart showing a voice command recognition process in a signal processing apparatus according to an exemplary embodiment of the present invention.

When a user inputs a voice command (S301), the signal processing apparatus 200 receives the input voice command. In this case, the signal processing apparatus 200 outputs a result of voice command recognition (S302).

The signal processing apparatus 200 determines whether or not the result of voice command recognition reaches a reliable level (S303). If it is determined that the result of voice command recognition reaches a reliable level (YES in S303), that is, if reliability of the result is above a predetermined level, the signal processing apparatus 200 performs the result of voice command recognition (S304). Specifically, the signal processing apparatus 200 may perform a particular operation corresponding to the recognized voice command.

The signal processing apparatus 200 determines whether or not the user cancels the corresponding operation (S305). If it is determined that the user does not cancel the corresponding operation, the signal processing apparatus 200 stores the voice command recognition result (S306). Specifically, the signal processing apparatus 200 may store the voice command recognition result and voice command recognition learning data in a memory or a disc according to a particular format. In this case, the signal processing apparatus 200 performs relearning based on the stored voice command recognition result (S307).

On the other hand, if it is determined at S303 that the voice command recognition does not reach the reliable level (NO in S303) or if it is determined at S305 that the user cancels the corresponding operation (YES in S305), the signal processing apparatus 200 proceeds to S316. In this case, the signal processing apparatus 200 stores the voice command recognition result (S316) and performs re-learning based on the stored voice command recognition result (S317). Then, the process returns to S301 where the signal processing apparatus 200 is again input with a voice command from the user. If it is determined that the voice command recognition does not reach the reliable level or if it is determined that the user cancels the corresponding operation, the signal processing apparatus does not perform the voice command recognition result and thus has to again receive voice command corresponding to a control instruction intended by the user.

In this manner, according to an exemplary embodiment of the present invention, unlike related art methods, even when the voice command recognition is unsuccessful, that is, even when the voice command recognition result is below a predetermined reliability level or the user cancels the operation corresponding to the voice command recognition result, the voice command recognition result is re-learned. In other words, by learning voice command instructions that have been unintentionally unsuccessful before the learning, the unsuccessful voice command instructions may be successfully utilized after the learning.

Figure 4:
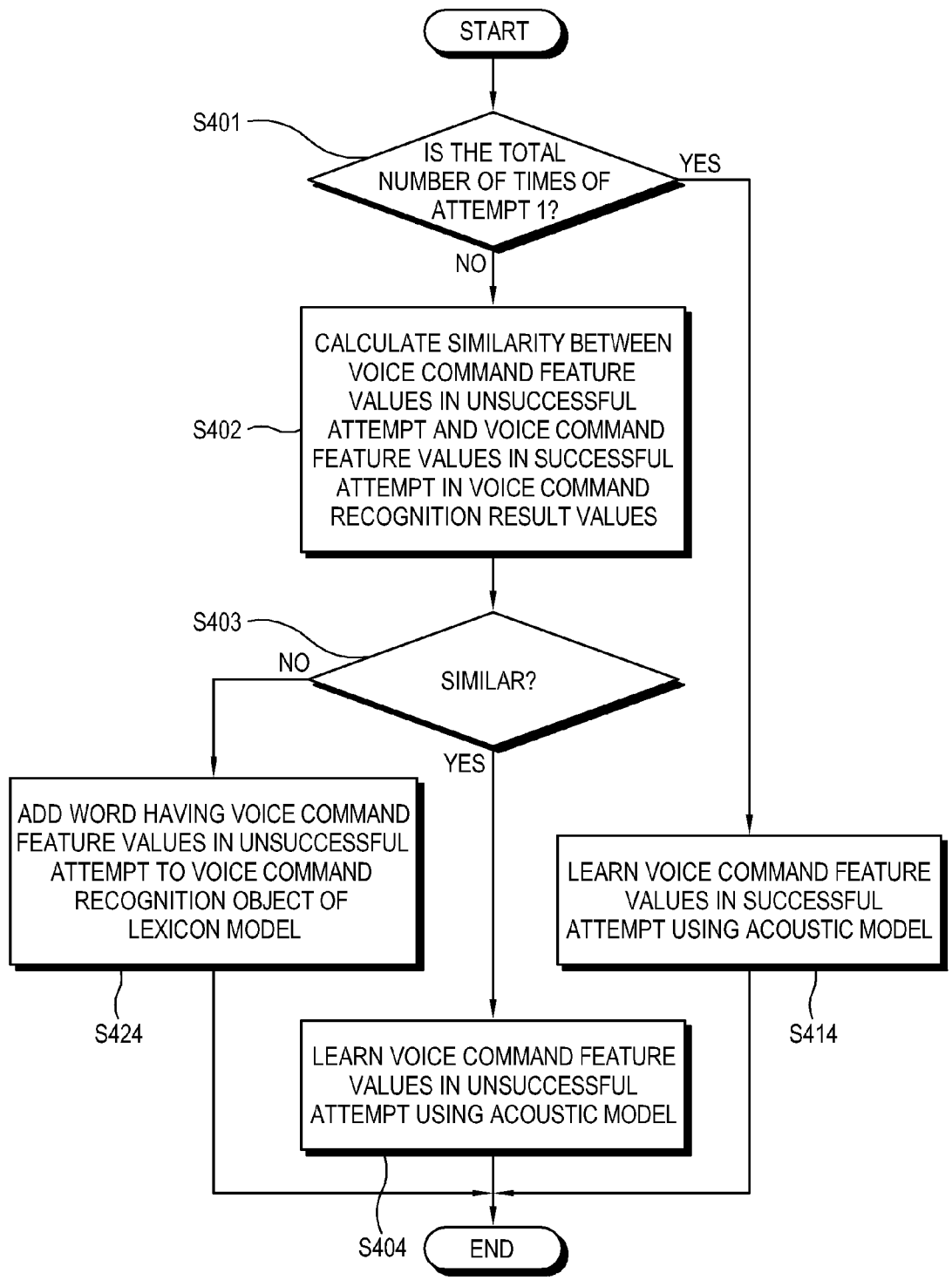
FIG. 4 is a flow chart showing a voice command learning process in a signal processing apparatus according to an exemplary embodiment of the present invention.

FIG. 4 is a flow chart showing a voice command learning process in a signal processing apparatus according to an exemplary embodiment of the present invention.

In the voice command learning process, if voice command feature values in unsuccessful and successful attempts are similar to each other and if a word that a user pronounces is identical to but different in intonation, tone, volume or the like from a successful word, the word is assumed to be an unsuccessful word. Accordingly, voice command data in an unsuccessful attempt are learned according to an Acoustic model.

On the other hand, if voice command feature values in unsuccessful and successful attempts are not similar to each other, it is assumed that a user speaks a word different from a successful word with the same intention as the successful word. In this case, accordingly, voice command data in an unsuccessful attempt are learned according to a Lexicon Acoustic model. Specifically, a word having a voice command feature value in an unsuccessful attempt is added to voice command recognition objects of the Lexicon model.

If voice command recognition is successful only once, voice command data in a successful attempt is learned using the Acoustic model. If voice command recognition is successful after a second attempt or more, voice command data is learned according to the Acoustic model or the Lexicon model based on the similarity between voice command feature values in an unsuccessful attempt and voice command feature values in a successful attempt.

When a voice command is learned, first, the signal processing apparatus 200 determines whether or not the total number of times of attempts of voice command recognition is 1 (S401).

If it is determined that the total number of times of attempts of voice command recognition is 1 (YES in S401), the signal processing apparatus 200 learns voice command feature values of a successful attempt using the Acoustic model (S414). On the other hand, if it is determined that the total number of times of attempts of voice command recognition is not 1 (NO in S401), the signal processing apparatus 200 calculates the similarity between voice command feature values in an unsuccessful attempt and voice command feature values in an successful attempt in a result of the voice command recognition (S402).

The signal processing apparatus 200 determines whether or not the voice command feature values in the unsuccessful attempt are similar to the voice command feature values in the successful attempt (S403). If it is determined that the voice command feature values in the unsuccessful attempt are similar to the voice command feature values in the successful attempt (YES in S403), the signal processing apparatus 200 learns the voice command feature values in the unsuccessful attempt using the Acoustic model (S404). On the other hand, if it is determined that the voice command feature values in the unsuccessful attempt are not similar to the voice command feature values in the successful attempt (NO in S403), the signal processing apparatus 200 adds a word having the voice command feature values in the unsuccessful attempt to a voice command recognition object of the Lexicon model (S424).

In this exemplary embodiment, even when the voice command recognition is unsuccessful, voice command is learned according to the Acoustic model or the Lexicon model. In case where voice command is learned according to the Acoustic model, it is possible to find a recognition error caused by user's pronunciation and intonation, and re-learn a user's unique pronunciation. In case where voice command is learned according to the Lexicon model, even when the user does not remember the correct voice command instructions well and speaks a different instruction with the same meaning, it is possible to add the corresponding word to recognition-targeted words for later recognition.

Figure 5:
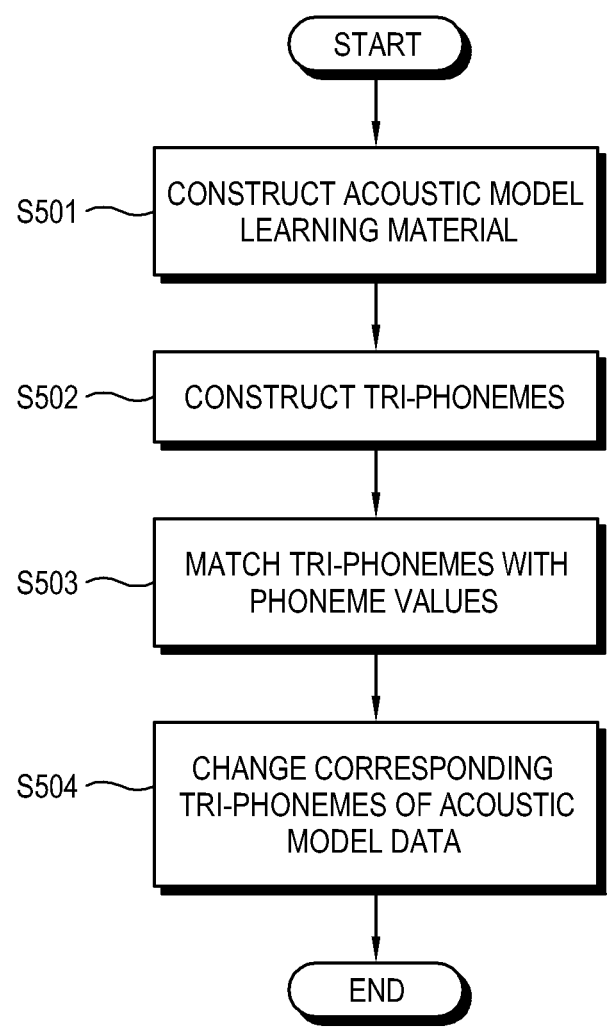
FIG. 5 is a flow chart showing a voice command learning process according to an Acoustic model.

FIG. 5 is a flow chart showing a voice command learning process according to an Acoustic model.

Assuming that the signal processing apparatus 200 is implemented by a digital TV and an instruction to turn up a volume of an output audio is defined as "Volume high," a first scenario of failure of voice command recognition is as follows.

A user pronounces the instruction, "Volume high," which is identical to voice command to be recognized. However, the signal processing apparatus 200 may erroneously recognize the user's voice command as a different word or fail in recognition of the user's voice command due to a difference in intonation, tone, volume and the like.

For the erroneous recognition, the user cancels a result of the voice command recognition and pronounces "Volume high" one more time. Also for the unsuccessful recognition, the user pronounces "Volume high" again. In attempting to recognize voice command again after failure of the voice command recognition, the user generally pronounces an instruction more loudly and more clearly than the voice command in the first attempt. The signal processing apparatus 200 normally recognizes the re-input voice command as "Volume high" and performs an operation corresponding to the instruction.

In an exemplary embodiment of the present invention, for the above scenario, the voice command is learned according to the Acoustic model. That is, the signal processing apparatus 200 calculates the similarity between the pronunciation, "Volume high," which was first input but was erroneously or unsuccessfully recognized, and the pronunciation, "Volume high," which is successfully recognized. If the similarity between the two pronunciations reaches a predetermined level or above, although the user pronounces the identical word, the signal processing apparatus 200 regards the word to be unsuccessfully recognized due to a difference in pronunciation or intonation. In this case, the signal processing apparatus 200 analyzes and learns a phoneme model of "Volume high," which was unsuccessfully recognized.

A Hidden Markov Modeling (HMM) method may be used in the voice command learning process according the Acoustic model. According to the HMM method, pronounced phonemes are discriminated by calculating feature values of voice command and obtaining statistical values of probability for particular phonemes. However, in general, when a user pronounces a word, pronunciation of a current phoneme is affected by a previous phoneme and a next phoneme. On this account, the HMM method applies a concept of tri-phonemes to combine three current phonemes to constitute a syllable.

The signal processing apparatus 200 constructs Acoustic model learning materials (S501). In this case, the signal processing apparatus 200 constructs tri-phonemes based on the Acoustic model learning materials (S502).

The signal processing apparatus 200 matches the tri-phonemes with a phoneme value (S503). That is, the signal processing apparatus 200 compares a phoneme of input voice command with a phoneme value of tri-phonemes and learns the voice command to be newly recognized.

In this case, the signal processing apparatus 200 changes a corresponding tri-phonemes value of Acoustic model data (S504).

In the related art, only a voice command from a successful attempt has been learned. Therefore, if voice command recognition was unsuccessful due to a difference in pronunciation or intonation although a user pronounced the same word, the input voice command could not be learned. According to an exemplary embodiment of the present invention, even in such a case, the input voice command is learned according to the Acoustic model.

Figure 6:
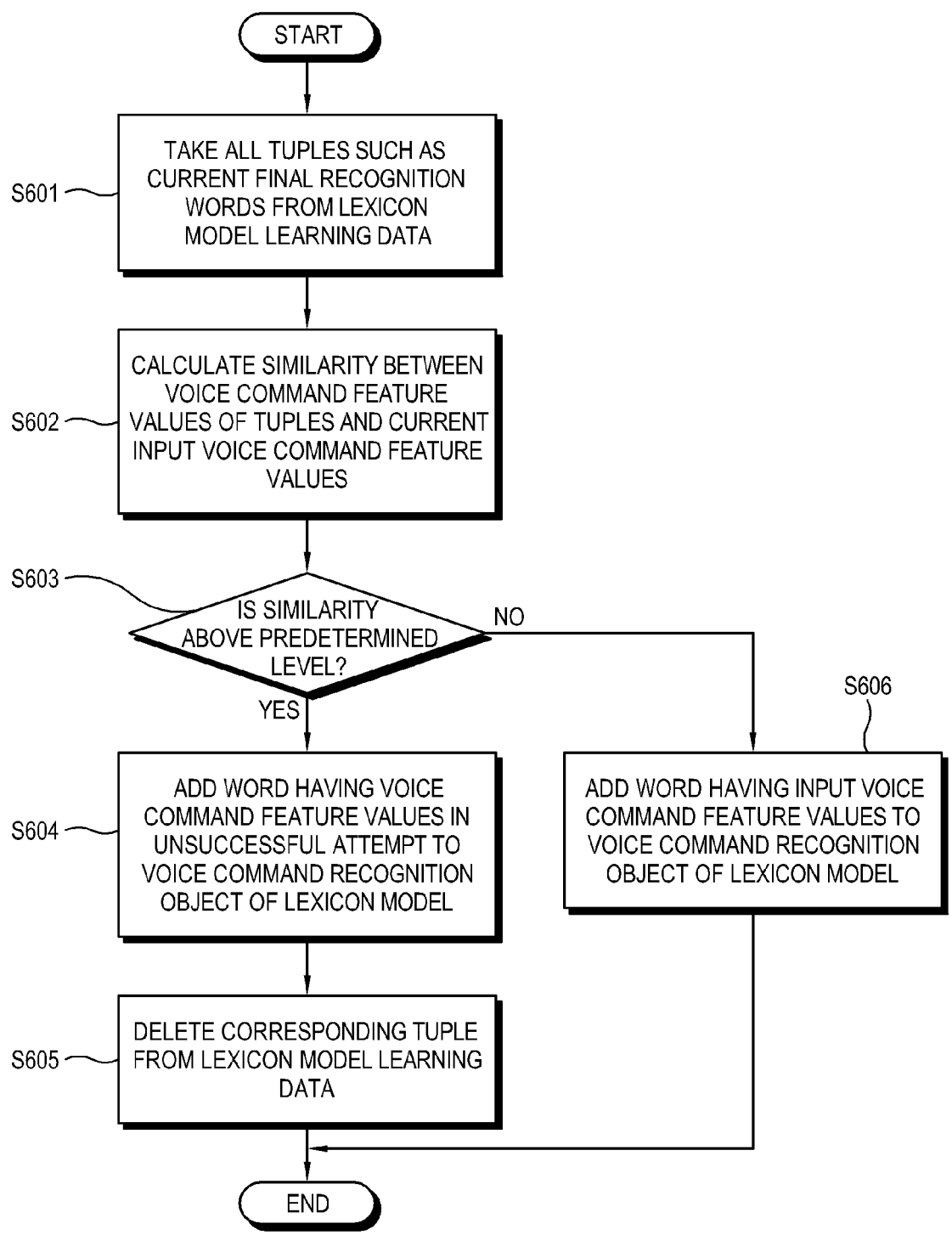
FIG. 6 is a flow chart showing a voice command learning process according to a Lexicon model.

FIG. 6 is a flow chart showing a voice command learning process according to the Lexicon model.

Under the same assumption as FIG. 5, a second scenario of failure of voice command recognition is as follows.

Under a situation where an instruction to turn up the volume of output audio is defined as "Volume high," a user pronounces the instruction, "Sound high." In this case, the signal processing apparatus 200 may erroneously recognize the user's voice command as a different word or fail in recognition of the user's voice command.

For the erroneous recognition, the user cancels a result of the voice command recognition and pronounces "Sound high" one more time. Also for the unsuccessful recognition, the user pronounces "Sound high" again. However, this instruction will be unsuccessful. In this case, the user may attempt to combine different instructions. For example, the user may sequentially pronounce different instructions having the same meaning, such as "Volume up" or "Volume high." At this time, when the user pronounces the instruction, "Volume high," voice command recognition will be successful.

In the exemplary embodiment of the present invention, for the above second scenario, the voice command is learned according to the Lexicon model. That is, the signal processing apparatus 200 calculates similarity between the pronunciation, "Sound high," which was first input but was erroneously or unsuccessfully recognized, and the pronunciation, "Volume high," which is successfully recognized. In this case, since the similarity between the two pronunciations is below a predetermined level, the signal processing apparatus 200 regards the different word, "Sound high," having the same meaning as "Volume high" to be unsuccessfully recognized, adds "Sound high," which was unsuccessfully recognized, to a word list, and connects it to a control operation corresponding to "Volume high."

If a voice command is to be learned according to the Lexicon model, the signal processing apparatus 200 takes all tuples such as current final recognition words from Lexicon model learning data (S601). The Lexicon model learning data will be described later with FIG. 7C.

The signal processing apparatus 200 calculates the similarity between voice command feature values of the tuples and current input voice command feature values (S602). In this case, the similarity may be calculated by determining the number of times of previous input of the current input voice command feature values. For example, if a user pronounces "Volume up" for a final recognition word, "Volume high," it is determined whether or not the user has previously pronounced "Volume up" alike. In this case, it is determined that the more the number of times of previous input of the current input voice command feature values, the higher the similarity.

The signal processing apparatus 200 determines whether or not the similarity is above a predetermined level with respect to the tuples (S603). Specifically, the signal processing apparatus 200 determines may determine whether or not the number of times of attempts to input an instruction other than the final recognition word is more than N.

If it is determined that the similarity is above the predetermined level (YES in S603), the signal processing apparatus 200 adds voice command feature values in an unsuccessful attempt to a voice command recognition object of the Lexicon model (S604). For example, phonemes of a word, "Volume up", are added to a voice command recognition-targeted word such that these phonemes match with "Volume high." In this case, the signal processing apparatus 200 deletes the corresponding tuple from the Lexicon model learning data (S605).

On the other hand, if it is determined that the similarity is not above the predetermined level (NO in S603), the signal processing apparatus 200 adds the input voice command feature values to the Lexicon model learning data (S606).

When the voice command is learned according to the Lexicon model in this manner, if the user pronounces the instruction, "Volume high," as "Volume up" or "Sound high," the instructions, "Volume up" and "Sound high," can be also recognized by adding the corresponding words to a recognition-targeted word list according to the Lexicon model.

FIG. 7A is a view showing an example of a stored voice command recognition result.

One tuple 710 consists of the attempt number, a feature value and success/failure, and a process from the first voice command recognition attempt to the first voice command recognition success and performance of a particular operation is controlled by one table. Success in success/fail refers to a case where a voice command recognition result has a predetermined reliability level or above and there is no request for cancel from a user. It can be seen from the table shown in FIG. 7A that feature values of voice command input until success of voice command recognition at an n-th attempt are stored in order.

FIG. 7B is a view showing an example of stored Acoustic model learning data.

The Acoustic model learning data stores feature values of phoneme data. For example, voice command feature values may be stored in match with all of phonemes, such as "b, t, d₃, ð..., æ, ɑː, er"

As shown in FIG. 7B, one tuple 720 consists of a final recognition word, a voice command feature value in final recognition, and a feature value of voice command to be learned. In this case, the voice command feature value in final recognition, and the feature value of voice command to be learned have similarity of a predetermined level or above.

FIG. 7C is a view showing an example of stored Lexicon model learning data.

The Lexicon model learning data finds phonemes from voice command and matches the found phonemes with a particular word. Specifically, a particular phrase or word and phonemes may be stored in match with each other. For example, a word, "sandwich" may be stored in match with phonemes, "sændwitʃ" or phonemes, "sænwid3." That is, the Lexicon model learning data defines and stores a form of pronunciation of particular words in this manner.

As shown in the table of FIG. 7C, one tuple 730 consists of a final recognition word and a voice command feature value.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A signal processing apparatus comprising:
a voice command recognition unit which recognizes an input voice command;
a voice command recognition learning unit which learns a recognition-targeted voice command by comparing feature values of the input voice command with feature values of the recognition-targeted voice command to determine a similarity; and
a controller, which controls the voice command recognition unit to recognize the input voice command based on reference data corresponding to the recognition-targeted voice command, controls the voice command recognition learning unit to learn the input voice command based on whether the voice command recognition is successful or unsuccessful, wherein if the voice command recognition is successful, performs an operation according to the successfully recognized voice command, herein if the voice command recognition is unsuccessful with regard to a first input voice command, the controller determines the first input voice command as the recognition-targeted voice command according to a user input, and next time, controls the voice command recognition unit to recognize a second input voice command based on the reference data and the first input voice command, and wherein if the voice command feature values in an unsuccessful attempt are similar to voice command feature values in a successful attempt, the voice command recognition learning unit learns the voice command feature values in the unsuccessful attempt using an Acoustic model, and if voice command feature values in the unsuccessful attempt are not similar to voice command feature values in the successful attempt, the voice command recognition learning unit adds a word having the voice command feature values in the unsuccessful attempt to a voice command recognition object using a Lexicon model.

2. The signal processing apparatus according to claim 1, wherein the controller controls the voice command recognition learning unit to learn features of the input voice command if the similarity between the input voice command and the recognition-targeted voice command is above a predetermined level.

3. The signal processing apparatus according to claim 2, wherein the voice command recognition learning unit learns the features of the input voice command using an Acoustic model.

4. The apparatus according to claim 3, wherein the Acoustic model comprises:
constructing tri-phonemes based on Acoustic model learning materials;
matching the constructed tri-phonemes with a phoneme value of the input voice command; and
changing the constructed tri-phoneme value.

5. The signal processing apparatus according to claim 1, wherein the controller controls the voice command recognition learning unit to add the input voice command to the recognition-targeted voice command if a similarity between the input voice command and the recognition-targeted voice command is below a predetermined level.

6. The signal processing apparatus according to claim 5, wherein the voice command recognition learning unit adds the input voice command to the recognition-targeted voice command using a Lexicon model.

7. The apparatus according to claim 6, wherein the Lexicon model comprises:
gather a plurality of tuples which includes final recognition words from a Lexicon model learning data;
calculate a similarity between the voice command features values of the plurality of tuples and the current input voice command feature levels;
determine if the calculated similarity is above a predetermined level;
if the similarity is above the predetermined level, add the input voice command to the voice recognition unit, and delete the corresponding tuple; and
if the similarity is below the predetermined level, add the input voice command word to the voice recognition unit.

8. The signal processing apparatus according to claim 1, further comprising a user input unit which receives information on whether the voice command recognition is unsuccessful or successful from a user.

9. A method of recognizing a voice command in a signal processing apparatus, the method comprising:
inputting a voice command;
recognizing the input voice command based on reference data corresponding to a recognition-targeted voice command;
determining a similarity between the input voice command and the recognition-targeted voice command by comparing feature values of the input voice command with feature values of the recognition-targeted voice command; and
learning the input voice command if the voice command recognition is unsuccessful and performing a particular operation corresponding to the recognized voice command if the voice command recognition is successful,
wherein if the voice command recognition is unsuccessful with regard to a first input voice command, the controller determines the first input voice command as the recognition-targeted voice command according to a user input, and next time, controls the voice command recognition unit to recognize a second input voice command based on the reference data and the first input voice command, and
wherein if the voice command feature values in an unsuccessful attempt are similar to voice command feature values in a successful attempt, learning the voice command feature values in the unsuccessful attempt using an Acoustic model, and if voice command feature values in the unsuccessful attempt are not similar to voice command feature values in the successful attempt, adding a word having the voice command feature values in the unsuccessful attempt to a voice command recognition object using a Lexicon model.

10. The method according to claim 9, wherein features of the input voice command are learned if a similarity between the input voice command and the recognition-targeted voice command is above a predetermined level.

11. The method according to claim 10, wherein the features of the input voice command are learned using an Acoustic model.

12. The method according to claim 9, wherein the input voice command is added to the recognition-targeted voice command if similarity between the input voice command and the recognition-targeted voice command is below a predetermined level.

13. The method according to claim 12, wherein the input voice command is added to the recognition-targeted voice command using a Lexicon model.

14. The method according to claim 9, further comprising receiving information on whether the voice command recognition is unsuccessful or successful from a user.

15. A signal processing apparatus comprising:
a voice command recognition unit which performs voice command recognition on an input voice command;
a voice command recognition learning unit which learns the input voice command by comparing feature values of the input voice command with feature values of the recognition-targeted voice command to determine a similarity when the input voice command is unsuccessfully recognized by the voice command recognition unit; and
a controller which performs a corresponding operation when the input voice command is successfully recognized by the voice command recognition unit, and controls the voice command recognition learning unit to learn the input voice command when the input voice command is unsuccessfully recognized by the voice command recognition unit,
wherein if the voice command recognition is unsuccessful with regard to a first input voice command, the controller determines the first input voice command as the recognition-targeted voice command according to a user input, and next time, controls the voice command recognition unit to recognize a second input voice command based on the reference data and the first input voice command, and
wherein if the voice command feature values in an unsuccessful attempt are similar to voice command feature values in a successful attempt, the voice command recognition learning unit learns the voice command feature values in the unsuccessful attempt using an Acoustic model, and if voice command feature values in the unsuccessful attempt are not similar to voice command feature values in the successful attempt, the voice command recognition learning unit adds a word having the voice command feature values in the unsuccessful attempt to a voice command recognition object using a Lexicon model.

16. A method of recognizing voice command in a signal processing apparatus, comprising:
inputting a voice command;
determining a result as to whether the input voice command is successfully or not successfully recognized;
performing a corresponding action when the input voice command is successfully recognized;
storing the determined result whether or not the input voice command is successfully recognized; and
learning the input voice command when the input voice command is not successfully recognized by comparing feature values of the input voice command with feature values of the recognition-targeted voice command to determine a similarity,
wherein if the voice command recognition is unsuccessful with regard to a first input voice command, the controller determines the first input voice command as the recognition-targeted voice command according to a user input, and next time, controls the voice command recognition unit to recognize a second input voice command based on the reference data and the first input voice command, and
wherein if the voice command feature values in an unsuccessful attempt are similar to voice command feature values in a successful attempt, learning the voice command feature values in the unsuccessful attempt using an Acoustic model, and if voice command feature values in the unsuccessful attempt are not similar to voice command feature values in the successful attempt, adding a word having the voice command feature values in the unsuccessful attempt to a voice command recognition object using a Lexicon model.

\* \* \* \* \*